(12) United States Patent
Fischer

(10) Patent No.: US 11,192,650 B2
(45) Date of Patent: Dec. 7, 2021

(54) OVERHEAD STOWAGE COMPARTMENT FOR A PASSENGER AIRCRAFT

(71) Applicant: DIEHL AVIATION LAUPHEIM GMBH, Laupheim (DE)

(72) Inventor: Dirk Fischer, Laupheim (DE)

(73) Assignee: Diehl Aviation Laupheim GmbH, Laupheim (DE)

(*) Notice: Subject to any disclaimer, the term of this patent is extended or adjusted under 35 U.S.C. 154(b) by 665 days.

(21) Appl. No.: 15/939,618

(22) Filed: Mar. 29, 2018

(65) Prior Publication Data
US 2018/0281956 A1 Oct. 4, 2018

(30) Foreign Application Priority Data
Mar. 29, 2017 (DE) .................... 10 2017 003 051.0

(51) Int. Cl.
B64D 11/00 (2006.01)
(52) U.S. Cl.
CPC .................. B64D 11/003 (2013.01)
(58) Field of Classification Search
CPC .................................................... B64D 11/003
See application file for complete search history.

(56) References Cited

U.S. PATENT DOCUMENTS

| 5,383,628 | A | * | 1/1995 | Harriehausen | A47B 46/005 244/118.1 |
| 6,045,204 | A | * | 4/2000 | Frazier | B64D 11/003 16/370 |
| 7,258,406 | B2 | | 8/2007 | Stephan et al. | |
| 8,016,231 | B2 | | 9/2011 | Hillen et al. | |
| 8,047,468 | B2 | * | 11/2011 | Schmitz | B64D 11/003 244/118.1 |
| 8,844,867 | B2 | | 9/2014 | Graf et al. | |
| 8,944,375 | B2 | | 2/2015 | Merz et al. | |
| 9,033,279 | B2 | * | 5/2015 | Graf | B64D 11/003 244/118.5 |
| 9,205,924 | B2 | | 12/2015 | Geng | |
| 9,371,674 | B2 | * | 6/2016 | Daul | F16F 9/12 |
| 9,630,718 | B2 | * | 4/2017 | Scown | B65D 90/54 |
| 2001/0011692 | A1 | * | 8/2001 | Sprenger | B64D 11/003 244/118.5 |

(Continued)

FOREIGN PATENT DOCUMENTS

| AT | 410536 B | 5/2003 |
| AT | 413812 B | 6/2006 |

(Continued)

Primary Examiner — Richard R. Green
Assistant Examiner — William L Gmoser
(74) Attorney, Agent, or Firm — Laurence A. Greenberg; Werner H. Sterner; Ralph E. Locher

(57) ABSTRACT

An overhead stowage compartment of a passenger aircraft includes a carrier and a pivoting part being pivotable about a pivot axis and rotatable in a pivoting range at least between an open position and a closing position. A resetting device brings about a closing force in the direction of the closing position at a gripping point of the pivoting part. The closing force is greater than and opposed to the gravitational force, which is effective at the gripping point, by using the unloaded pivoting part. The stowage compartment has a holding device through the use of which the pivoting part can be held at the open position.

14 Claims, 5 Drawing Sheets

(56) References Cited

U.S. PATENT DOCUMENTS

| | | | |
|---|---|---|---|
| 2003/0146629 A1* | 8/2003 | Cheever | B64D 11/003 292/167 |
| 2008/0073462 A1* | 3/2008 | Wolf | B64D 11/003 244/118.1 |
| 2011/0253714 A1 | 10/2011 | Ivester et al. | |
| 2012/0091734 A1* | 4/2012 | Schendel | E05B 41/00 292/126 |
| 2012/0273615 A1* | 11/2012 | Rafler | B64D 11/003 244/118.5 |
| 2013/0249365 A1* | 9/2013 | Zinke | B64D 11/003 312/319.5 |
| 2014/0246968 A1* | 9/2014 | Geng | B64D 11/003 312/319.2 |
| 2016/0114889 A1* | 4/2016 | Kearsey | E05B 53/003 312/246 |
| 2017/0066533 A1* | 3/2017 | Long | E05C 19/00 |
| 2017/0152045 A1* | 6/2017 | Voss | B64D 11/003 |
| 2018/0209197 A1* | 7/2018 | Williams | E05F 5/06 |
| 2018/0258673 A1* | 9/2018 | Schoerkhuber | B64D 11/003 |
| 2018/0319501 A1* | 11/2018 | Schorkhuber | E05F 3/10 |

FOREIGN PATENT DOCUMENTS

| | | | |
|---|---|---|---|
| DE | 4335151 A1 * | 4/1995 | B64D 11/003 |
| DE | 102007003363 A1 | 7/2008 | |
| DE | 102011118548 A1 | 5/2013 | |
| DE | 102011118553 A1 | 5/2013 | |
| DE | 1020111187550 A1 | 5/2013 | |
| DE | 102013003364 A1 | 9/2014 | |
| EP | 3053830 A1 | 8/2016 | |

* cited by examiner

OVERHEAD STOWAGE COMPARTMENT FOR A PASSENGER AIRCRAFT

CROSS-REFERENCE TO RELATED APPLICATION

This application claims the priority, under 35 U.S.C. § 119, of German Patent Application DE 10 2017 003 051.0, filed Mar. 29, 2017; the prior application is herewith incorporated by reference in its entirety.

BACKGROUND OF THE INVENTION

Field of the Invention

The invention relates to a stowage compartment for the overhead region of a passenger cabin of a passenger aircraft.

Such a stowage compartment is known, for example, from European Patent Application EP 3 053 830 A1, corresponding to U.S. Pat. No. 9,630,718. The stowage compartment automatically opens to an open position if a closure mechanism is released, without a force having to be applied by a user.

SUMMARY OF THE INVENTION

It is accordingly an object of the invention to provide an improved overhead stowage compartment, which overcomes the disadvantages of the heretofore-known devices of this general type.

With the foregoing and other objects in view there is provided, in accordance with the invention, a stowage compartment for the overhead region of a passenger cabin of a passenger aircraft which includes a carrier that can be mounted in the passenger aircraft. The stowage compartment contains a pivoting part which is mounted on the carrier so as to be pivotable about a pivot axis. The pivoting part may also be referred to as a bin. The pivoting part is rotatable about a pivot axis in a pivoting region at least between an open position and a closing position. The stowage compartment contains a resetting device which acts between the carrier and the pivoting part, that is to say it can generate a relative force or a relative torque between the carrier and the pivoting part. In an installed position of the overhead stowage compartment, the resetting device brings about, at a gripping point of the pivoting part, at least in a first partial region of the pivoting region, a closing force toward the closing position. The installed position is that position when the stowage compartment is mounted as intended in the passenger aircraft and the passenger aircraft is in a flat zero position, for example standing on a flat manoeuvring area or flying straight ahead without delay. The gripping point is that point or region on the pivoting part on which a user acts in order to move or to rotate the pivoting part manually in the region between the open position and the closing position, for example a handle or a grip.

At least in a second partial region of the pivoting region that begins at that end of the pivoting region which is opposite the closing position (in particular the open position or the release position which is described further below), the closing force is greater than and opposed to the opening force of the pivoting part that is effective at the gripping point and is caused by the gravitational force (referred to as "the gravitational force" for short below), which is caused by the unloaded pivoting part, optionally with all of the additional components which are connected thereto and also cause the force. The stowage compartment has a holding device. The pivoting part can be held at the open position by the holding device.

The pivoting part (which can also be referred to as the "actual stowage compartment") serves for receiving stowage items, in particular clothing and hand luggage of passengers. The stowage compartment is therefore an overhead stowage compartment (OHSC).

In a known manner, the pivoting part is in particular also lockable in the closing position, for example by using a conventional lock. In the second partial region, the resetting device therefore brings about a closing force which, without manual action at the gripping point, moves the empty pivoting part in the direction of the closing position counter to the gravitational force as far as the end of the second partial region. An equilibrium of forces then prevails there between the gravitational force and the resetting force at the gripping point. Although a closing force is also brought about by the resetting device in the first or remaining first partial region (the two partial regions can overlap), the closing force is directed counter to and is less than the gravitational force acting at the gripping point, and therefore can, if need, have assistance there at the gripping point during the manual closing of the pivoting part, and therefore the pivoting part can be closed more easily counter to the gravitational force than without resetting device.

With regard to the gravitational force, the closing force in this case relates in particular to that part of the closing force which is directed counter to the gravitational force at the gripping point. "Action of the gravitational force" should be understood as meaning that the gravitational force is correspondingly present at the gripping point or that there has to be initial work there counter to that force in order to move the pivoting part in the closing direction.

The invention affords the advantage that, during the closing, the pivoting part either moves automatically—depending on the loading—in the second partial region or at least provides a significant force assistance for manual action at the gripping point. Nevertheless, the in particular empty or only slightly loaded pivoting part is lockable at the open position in order, during loading and unloading, not to have to hold the pivoting part counter to the closing force, which is caused by the resetting device. Loading and unloading in the open position is thus possible. "Slightly loaded" means that the gravitational force caused by the loaded pivoting part is still smaller than the closing force.

In a preferred embodiment, the resetting device contains an energy accumulator. During the opening of the pivoting part, the energy accumulator is charged with energy and at least contributes to generating the closing force or completely causes the closing force by dissipation of the stored energy during the unloading. The force or energy used for closing therefore does not have to be supplied externally, but rather is generated during opening of the pivoting part and stored in the energy accumulator. This leads to a simple and independent system.

In a preferred variant of this embodiment, the energy accumulator is a mechanical energy accumulator, in particular a spring element, for example a gas-filled compression spring. It is in particular a helical spring in this case. Energy accumulators of this type are obtainable particularly simply and cost-effectively and are particularly suitable for the present use.

In a preferred embodiment, the stowage compartment contains a damping element which damps the pivoting movement of the pivoting part in the pivoting region. In particular, the damping element is contained in the resetting device or is integrated therewith to form a common resetting/damping component. The damping element is in particular a conventional gas or oil damper. A common component is then in particular a damper which is surrounded by a helical spring. A damping element increases the ease of operation of the stowage compartment.

In a preferred embodiment, the stowage compartment contains a mechanical module. The latter contains an active part which is mounted exclusively on the pivoting part. The active part is responsible for generating the closing force, i.e. it contains the resetting device. The active part optionally also brings about the damping function, i.e. it contains the damping element. The active part contains a drive element. The mechanical module also contains a passive drive part which is mounted exclusively on the carrier and which serves for driving the active part through the drive element. For this purpose, the drive part engages in the drive element and acts on the latter and thus serves for actuating the active part. During pivoting of the pivoting part, the passive drive part which is mounted on the carrier is stationary and the pivoting part rotates with respect thereto. The active part drives the active part from the relative movement. The active part of the mechanical module can thus already be preassembled on the pivoting part in a particularly simple manner and first of all the carrier can be installed in the aircraft during the installation of the stowage compartment. The pivoting part with the preassembled active part is subsequently inserted, wherein in particular automatic action between the drive element and the drive part takes place. Particularly simple installation of the stowage compartment is thus also possible.

In a preferred variant of this embodiment, the drive between the drive element and the drive part is brought about by an interlocking element. A corresponding interlocking connection is stable and robust and is particularly simple to produce during the abovementioned installation, for example by insertion of corresponding matching parts into one another.

In a preferred embodiment, the holding device contains a clamping element and/or an adhesion element. A clamping element of this type is, for example, a spring clamp with a clamping pin, and an adhesion element is, for example, a magnetic pairing formed of a magnet and a magnetizable mating element or second magnet. In other words, in this embodiment, the pivoting part is held in the open position by clamping or adhesion of the corresponding holding device. In order to close the pivoting part, the adhesion or clamping force of the holding device then has to be overcome. Holding devices of this type are available and known in diverse forms and can be used particularly simply and cost-effectively in the stowage compartment.

In a preferred embodiment of the invention, the holding device is releasable by movement of the stowage compartment out of the open position in the direction away from the closing position toward a release position or in the release position. This constitutes a particularly convenient possibility for unlocking or releasing the holding device, which possibility can be operated by a certain movement sequence which is known from many sectors in the art, for example from unlocking flap compartments in furniture making, or unlocking ballpoint pens, etc. In particular, no particular force of the holding device, such as a clamping or adhesion force, has to be overcome in this case in order to release the pivoting part from the locked open position. For this purpose, the release, i.e. the intended movement in the closing direction, merely requires a comparable small movement in the opposite direction, namely toward the release position.

In a preferred variant of this embodiment, the holding device contains a latching device which, in the open position, latches on a latching piece (latching position), and a release element which is activated in the release position and, in the process, switches the latching device to be in an ineffective state with respect to the latching position, and therefore the latching device can pass back, e.g. slide back, at the latching position through the latching piece. Latching device and release element combinations of this type are known and/or conceivable in principle in many embodiments, e.g. from furniture making, and are not intended to be explained in more detail herein. In particular, the latching device latches by using spring action in the open position, wherein, when the latching position is exceeded, the release element moves the latching device out of the release position and beyond the latching piece counter to the spring force. Alternatively, for example, latching mechanisms based on gravitational force and operating without spring action are also conceivable.

A spring-based configuration can also be used in the aircraft since that configuration operates independently of gravitational force and the direction of gravitational force in the aircraft may vary depending on the flight situation.

In a preferred variant of this embodiment, the stowage compartment contains a stop element which defines an end position of the pivoting part at the release position. The stop device contains the latching piece for latching the latching device in the open position. The stop element carries out a dual function in this case both as a stop device and as a latching device, i.e. a counter piece or a functional part of the latching device, which leads to an overall more compact and less component-intensive configuration for the stowage compartment.

In a preferred embodiment, the holding device contains a slotted guide mechanism and a sliding element which can be guided in the slotted guide mechanism. Due to movement of the pivoting part from the closing position toward the open position—optionally furthermore also in the direction of the release position or beyond the latter—the sliding element can be introduced into the slotted guide mechanism and can be guided over an insertion path into a holding portion of the slotted guide mechanism and can be held there. Due to the pivoting part being brought out of the open position through the release position in the direction of the closing position and over a removable path, the sliding element can be removed again from the holding portion and finally from the slotted guide mechanism.

Slotted guide mechanisms of this type are also well known in principle in diverse ways, for example from ballpoint pens, and will not be explained in more detail herein. A corresponding slotted guide mechanism is in particular called a cardioid or constructed as such. In mechanisms of this type, a finger (sliding element) runs in an at least approximately heart-shaped or heart-like slotted guide curve (slotted guide mechanism). Corresponding elements for such a holding device can be obtained or produced simply and cost-effectively.

In a preferred variant of this embodiment, the sliding element is mounted movably on the carrier, and the slotted guide mechanism is mounted fixedly on the pivoting part. The mounting can also take place in the reverse manner (sliding element movable on the pivoting part, slotted guide mechanism fixed on the carrier). The corresponding installation variant can be selected depending on the available installation space or other criteria in order to obtain an optimum holding device for the given situation.

In a preferred variant of the embodiment, the sliding element is mounted on the carrier, and the slotted guide mechanism is mounted on the pivoting part. In particular, in conjunction with the abovementioned installation of an active part of the mechanical module exclusively on the pivoting part, a favorably premanufactured pivoting part thus arises which, during the installation, merely has to be inserted into the carrier mounted in the aircraft.

In a preferred embodiment of the invention, the holding device can be unlocked by loading of the pivoting part with a stowage item causing a release force at the gripping point. This takes place in particular by the fact that the pivoting part is thereby brought into the release position. Particularly simple operability of the stowage compartment thus arises: first of all, the, for example, empty pivoting part is brought manually into the open position and locked there. The pivoting part is then loaded with the stowage item, with the stowage item causing the holding device to be unlocked. After the stowage compartment is loaded, the holding device is therefore already unlocked and the pivoting part can be manually closed without a further intermediate step. In particular, the holding device is unlocked by the stowage item by the pivoting part being brought by the stowage item into the release position or being bringable into the latter. This is achieved by the closing force in the open position being dimensioned in such a manner that this is greater than the gravitational force of the empty pivoting part, but smaller than the gravitational force of the pivoting part loaded with a critical stowage item mass. After loading with the critical stowage item mass, the closing force is therefore overcome and the pivoting part drops automatically into the release position. For this purpose, a holding device which prevents movement of the pivoting part only toward the closing position, but permits the movement toward the release position is favorable.

In a preferred embodiment, corresponding contact devices are attached to both the carrier and to the pivoting part. In an intended static load situation of the stowage compartment, the contact devices have a clearance with respect to each other. It is only during a dynamic load situation of the greater loading than in the static load procedure that the contact devices lie against each other. The intended static load situation is when the aircraft, for example, is stationary or is in delay-free flight and the pivoting part is loaded only with the maximally permissible stowage item. A dynamic load situation occurs, for example, during acceleration or deceleration of the aircraft, for example during take-off or landing. In this case, the stowage compartment is subjected to a higher mechanical loading than in the static load situation. This additional loading is absorbed by the contact devices by lying against one another and therefore by using a frictional connection. This confers additional stability on the stowage compartment when required (high load situation) without the contact devices acting on each other in the static load situation. Therefore, in the static load situation or when not subjected to a load, free movability of the pivoting part in relation to the carrier is possible without the contact device acting in this case with additional forces.

This counteracts the effect, for example, that sidewalls of the pivoting part are structurally weakened by a resetting/damper unit or cutouts necessary therefor or by thinner material.

The invention is based on the following findings, observations and considerations and also has the following embodiments. The embodiments are sometimes also simply called "the invention" herein. The embodiments herein may also contain parts or combinations of the abovementioned embodiments or may correspond thereto and/or may optionally also include embodiments which have not previously been mentioned.

The aim of the invention is to reduce the closing forces of approximately 180 Newtons required in the case of currently commercially available stowage compartments to approximately 108 Newtons.

The invention uses the finding that, in the case of the commercially available stowage compartments, use is made of a "comparatively weak" spring which (merely) compensates for the dead weight of the empty OHSC bin. A holding open function is unnecessary.

The invention is based on the basic concept that, when a stowage compartment (OHSC) is opened by hand, a spring (energy accumulator) in a spring/damper system will be stressed. In an open position, a mechanism prevents automatic closing of the OHSC. If sufficient luggage is loaded into the OHSC bin (pivoting part), the system is automatically locked. If insufficient weight is loaded into the OHSC bin, a passenger or cabin crew can unlock the latching by fully pulling on the OHSC bin (in the direction away from the closing position beyond the open position into a release position).

The invention is based on the concept of using a stronger spring as the energy accumulator. The OHSC housing (carrier) and bin (pivoting part) have been constructed so as to provide the required space for such a spring/damper system.

However, a stronger spring device means that a passenger has to completely pull open the empty OHSC bin manually counter to the—in particularly linearly increasing—spring force. If the passenger were to let go again of the OHSC bin that was opened in such a manner, without having placed luggage of a certain weight into the OHSC bin beforehand, the OHSC bin would automatically close again as far as a certain opening angle. The concept of the invention prevents such an automatic closing by using a latching in an open OHSC bin position. It in particular uses a dual function of customarily used components "end stop" (stop of the pivoting part in the open position or in the release position) and OHSC latch keeper (lock holder for the lock of the overhead luggage compartment), in each case as part of a holding open function.

The holding open function is released through a mechanism. For example, two principles are conceivable in this case: that of a latching mechanism or that of a slotted guide mechanism.

According to the invention, a latching mechanism or a slotted guide mechanism are therefore also realized in the overhead luggage compartment. It is thus possible to reduce the manual force for closing the entire overhead luggage compartment system.

According to the invention, the following operating principle arises: if the OHSC bin is opened, a spring-loaded hook (latching device) grips over a keeper (latching piece) and prevents automatic closing of the OHSC. If sufficient weight (luggage) is loaded into the OHSC bin, the system is automatically unlocked. If insufficient weight (luggage) is loaded into the OHSC bin, the passenger or the cabin crew can unlock the latching by pulling open the OHSC bin. The present invention permits the use of a stronger spring. Through the use of the holding open function, a luggage compartment with a stronger spring in the spring/damper system does not automatically close. The invention can be skillfully integrated or used in existing concepts of endstop/keeper. For example, the adjustability of the opening angle (open OHSC bin position) is maintained.

According to the invention, a pivotable OHSC with a pivot axis is produced. A lock mechanism keeps the OHSC bin closed in the upper (closing) position. If the lock handle is pulled, the pivoting part moves downward by a certain angle. In order to completely open the pivoting part, passengers or cabin crew have to pull open the pivoting part counter to the spring elements. In the open position, the pivoting part is held open by using an additional mechanical element. The latter releases or automatically opens up the pivoting part if a certain quantity of payload is loaded into the pivoting part. In order to close the pivoting part, the passenger or the crew has to push the pivoting part into the closing position. They are assisted in this case by the spring (resetting device) which has been loaded with energy during the opening movement. The movement during opening and closing of the pivoting part is slowed down by using damper elements in the OHSC. The invention contains the kinematic system (resetting device) of the OHSC which stores energy during the opening of the pivoting part in order to provide a certain manual force assistance during the closing of the pivoting part.

The aspects of the invention are:
the kinematic system with damped movement during the opening and closing,
the holding open function, which can be realized by two exemplary variants (latching device, slotted guide mechanism),
the contact devices (so-called X pads) for the dynamic load situation, which are preferably mounted on the rear side of the OHSC bin and the corresponding opposite wall of the carrier (OHSC housing shear wall). They serve for relieving the OHSC carrier sidewalls from load, the latter being weakened in particular by a required cutout for the space requirements of the damper/spring system which is comparatively large in comparison to conventional configurations.

According to the invention, a holding open function in an overhead luggage compartment with closing force assistance is produced.

Other features which are considered as characteristic for the invention are set forth in the appended claims.

Although the invention is illustrated and described herein as embodied in a overhead stowage compartment for a passenger aircraft, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
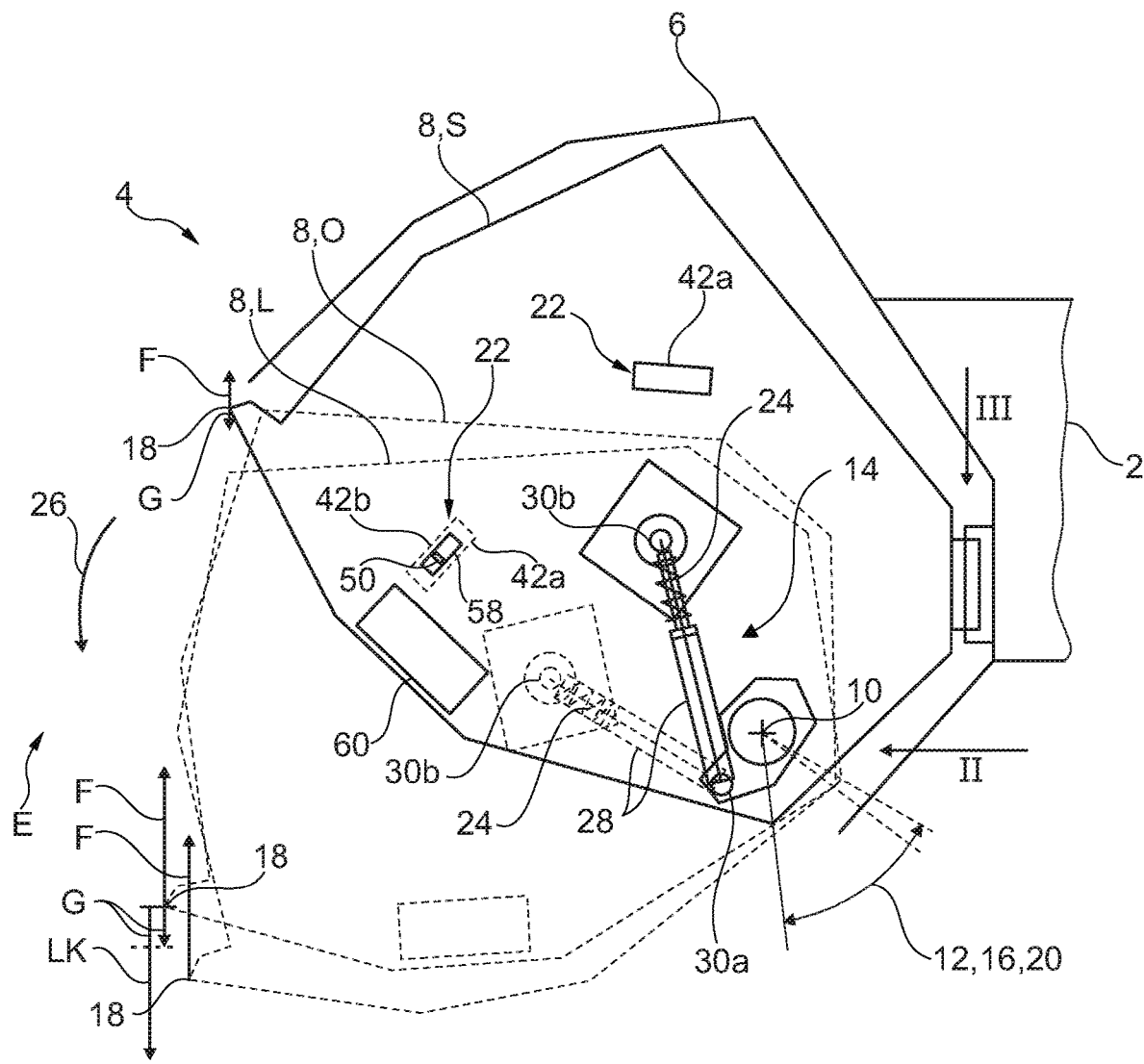
FIG. 1 is a fragmentary, diagrammatic, vertical-sectional view of a passenger cabin with an overhead stowage compartment.

Referring now to the figures of the drawings in detail and first, particularly, to FIG. 1 thereof, there is seen a fragmentary, diagrammatic illustration of a ceiling region of a passenger cabin 2 of a passenger aircraft. A stowage compartment 4 is mounted on the ceiling region or on or in the passenger cabin 2. The stowage compartment 4 contains a carrier 6 which constitutes the part actually mounted on the passenger cabin 2. The stowage compartment 4 also contains a pivoting part 8 which is in turn mounted on the carrier 6 so as to be pivotable about a pivot axis 10. The pivoting part 8 can be rotated or pivoted about the pivot axis 10 in a pivoting region 12 between a release position L (illustrated by dashed lines) and a closing position S (illustrated by solid lines). The corresponding positions always relate to the relative position between the pivoting part 8 and the carrier 6.

The stowage compartment 4 contains a resetting device 14 which acts both on the carrier 6 and on the pivoting part 8. FIG. 1 shows an installed position E of the stowage compartment 4, that is to say when the stowage compartment 4 is in the state mounted as intended in the passenger cabin 2 and the aircraft is oriented so as to be level and is standing in this case on a flat manoeuvring area. In the installed position E, the resetting device 14 brings about, at a gripping point 18 of the pivoting part 8, in a first partial region 16 of the pivoting region 12, a closing force F in the direction of the closing position S. The gripping point 18 is the point at which an operator acts on the pivoting part 8 in order to open or to close the latter. In the illustrated example, the first partial region 16 extends over the entire pivoting region 12, that is to say the closing force F is greater than or equal to zero over the entire pivoting region 12. In the illustrated example, the closing force F is at the smallest in the closing position and is diametrically opposed to or is slightly greater than a gravitational force G which likewise acts on the gripping point 18 and is caused by the dead weight of the empty pivoting part 8 (and of other components moving the pivoting part toward the open position). The closing force F then increases continuously through the open position O toward the release position L.

In a second partial region 20 of the pivoting region 12, the closing force F is greater than the gravitational force which acts on the gripping point 18 and is effective on the pivoting part 8. In the example, the same is likewise true of the entire pivoting region 12 (possibly with the exception of the closing position S, if the two forces are identical in size there, that is to say the pivoting part 8 is in balance). For all of the other pivoting positions, the closing force F is greater than the corresponding gravitational force, and therefore, when a pivoting part 8 is empty, it is automatically reset into the closing position S. The second partial region 20 begins at that end of the pivoting region 12 which is opposite to the closing position S, in this case in the release position L.

The stowage compartment 4 contains a holding device 22. The pivoting part 8 is lockable at the open position O by the holding device. A lock 60 serves for locking the pivoting part 8 in the closing position S.

The resetting device 14 contains an energy accumulator 24 which is loaded with energy during opening of the pivoting part (in the direction of an arrow 26 indicating an opening direction). During the unloading, that is to say during a movement counter to the direction of the arrow 26, the energy output from the energy accumulator 24 serves for generating the closing force F. In the present case, the energy accumulator 24 is a helical spring, i.e. a spring element. The stowage compartment 4 also contains a damping element 28, in this case a gas-filled compression damper, which damps the pivoting movement in the pivoting region 12. In the present case, the damping element 28 is integrated together with the energy accumulator 24 to form a spring/damper system. The spring/damper system acts on the carrier 6 through a first installation point 30a and on the pivoting part 8 through a second installation point 30b. During the opening movement of the pivoting part 8, the distance between the installation points 30a, b is shortened, and therefore the spring is compressed and tensioned. During the closing movement, the spring expands and pushes the installation points 30a, b apart, which leads to a torque at the pivot axis 10 and thus to the closing force F at the gripping point 18.

Figure 2:
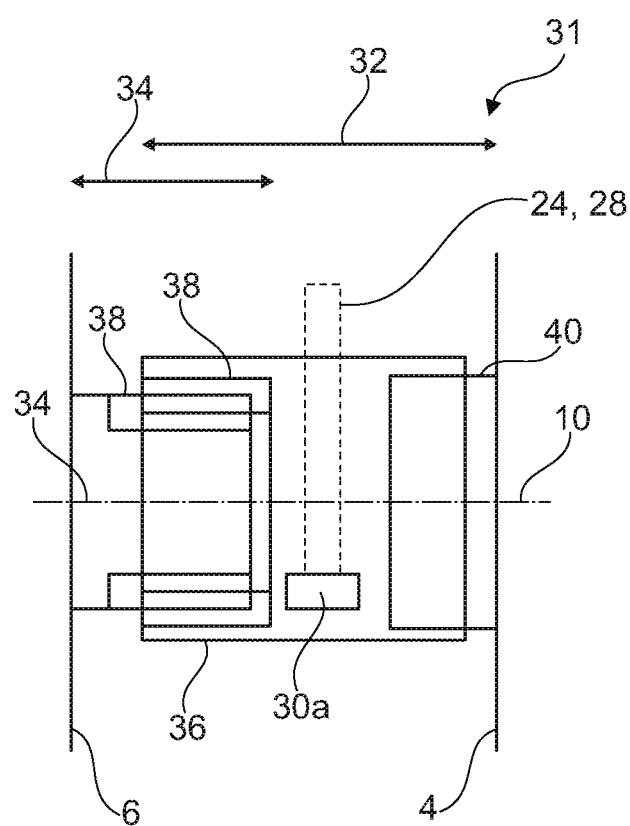
FIG. 2 is a rear-elevational view of a detail II of FIG. 1.

The resetting device 14 is partially illustrated in detail in FIG. 2 in the direction of view of the arrow II. The resetting device 14 is part of a mechanical module 31. The mechanical module 31 contains an active part 32 mounted exclusively on the pivoting part 8. The active part 32 contains a drive element 36. The mechanical module 31 contains a passive part in the form of a drive part 34 which is mounted exclusively on the carrier 6. The drive part 34 serves (during the pivoting of the pivoting part 8) for driving the drive element 36. The drive element 36 serves for actuating the active part 32 of the mechanical module, in this case especially of the resetting device 14, in this case for compressing and relieving the energy accumulator 24 of load and for moving the damper 28.

In the present example, the passive drive part 34 is a shaft which is concentric with respect to the pivot axis 10 and has a first part of an interlocking element 38. The drive element 36 is a sleeve part matched to the drive part 34, with a matching counterpiece of the interlocking element 38. The drive element 36 is also concentric with respect to the pivot axis 10 and is mounted rotatably about the latter on a shaft piece 40 which is connected to the pivoting part 8. The installation point 30a is fastened to the drive element 36.

During the installation of the pivoting part 8 in the carrier 6, the drive element 36 is pushed onto the drive part 34 in such a way that the interlocking element 38 forms an interlocking connection which is rotationally fixed with respect to the pivot axis 10.

During the pivoting of the pivoting part 8, the shaft piece 40 rotates with the latter and therefore relative to the drive element 36 which is securely held by the drive part 34. The position of the installation point 30b, which rotates with the pivoting part 8, in relation to the installation point 30a, which is securely held with the drive element relative to the carrier 6, therefore also changes. The installation point 30a is therefore held fixedly with respect to the carrier 6, wherein the installation point 30b moves together with the pivoting part 8.

In a simple embodiment, the holding device 22 is a clamping element and alternatively or additionally an adhesion element. For example, a first part 42a is constructed as a spring or holding clamp and a second part 42b as a clamping pin which is clampable therein and releasable. Alternatively or additionally, the first part 42a is constructed as a magnet and the second part 42b as a counter magnet or as a magnetizable counter element, or vice versa. The holding device can be released by a holding force being overcome when the pivoting part is pulled out of the open position O in the direction of the closing position S.

Figure 3:
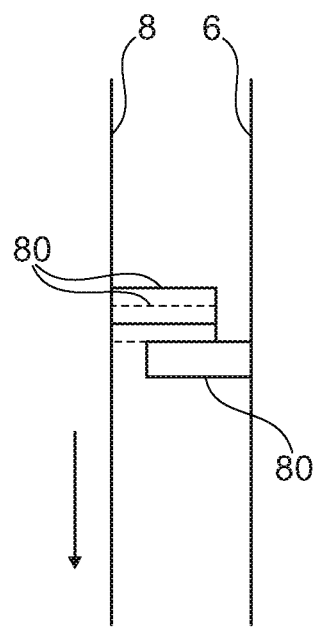
FIG. 3 is a top-plan view of a detail III of FIG. 1.

Contact devices 80 are attached to both the carrier 6 and the pivoting part 8. FIG. 3 shows a view of the contact devices 80 in the direction of the arrow III in FIG. 1. FIGS. 1 and 3 show the static intended load situation of the stowage compartment 4. The contact devices 80 in this case have a clearance with respect to each other, that is to say they cannot lie against each other. A dynamic load situation, in this case during deceleration of the aircraft on a runway, is additionally illustrated by dashed lines in FIG. 3. In this case, the stowage compartment 4 undergoes deformation. The contact devices 80 lie against each other and then prevent deformation and thus impart additional stability to the stowage compartment 4 when the need arises. In the static load situation, there is no action between the contact devices 80, and therefore the contact devices 80 do not obstruct or influence the movement of the pivoting part 8.

However, in an alternative embodiment, the holding device 22 can be unlocked by a movement of the pivoting part 8 away from the closing position S into the release position L when the holding device has been unlocked in the open position O. FIGS. 4 and 5 show holding devices 22 which are suitable for such an operation or require the latter.

FIG. 4 shows an embodiment of the holding device 22. The holding device 22 contains a latching device 44 which latches in the open position O, in this case a latching hook which is pivotable about an axis 46, and a release element 48 which is activated in the release position L and, in the process, switches the latching device 44 into an ineffective state for the unlocking of the holding device 22. The latching device 44 (see FIG. 1) is fastened as the part 42a to the pivoting part 8. In the present case, the stowage compartment 4 contains a stop device 58 which defines an end position of the pivoting part 8 at the release position L. A latching piece 50 is part of the stop device 58 and forms the part 42b which is fastened to the carrier 6.

In the open position O, the latching device 44 engages behind a latching piece 50. The release element 48 is in turn mounted about the latching device 44 so as to be rotatable about an axis 52 and is spring-loaded in the direction of rotation counter to arrow 56. In the illustrated example, the latching piece 50 is fastened rigidly to the carrier 6. The latching device 44 is fastened to the pivoting part 8 so as to be rotatable about the axis 46 and is spring-loaded in the direction of the latching position (counter to arrow 54).

Figure 4A:
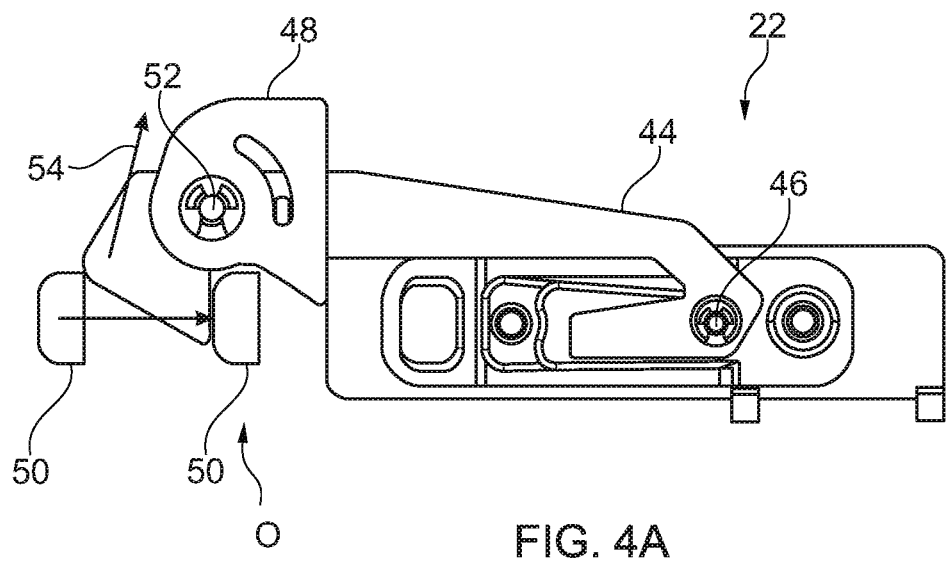
FIGS. 4A, 4B and 4C are front-elevational views of a holding device in the form of a latching device.

FIG. 4 merely shows a symbolic illustration, wherein the latching piece 50 is in each case repeatedly illustrated, which is intended to illustrate the relative movement thereof with respect to the pivoting part 8. FIG. 4A shows the bringing of the pivoting part 8 from the closing position S into the open position O, wherein, shortly before the open position O is reached, the latching device 44 runs through a run-on slope onto the latching piece 50 and moves in this case about the axis 46 initially in the direction of the arrow 54 and subsequently pivots back and latches in the open position O.

Figure 4B:
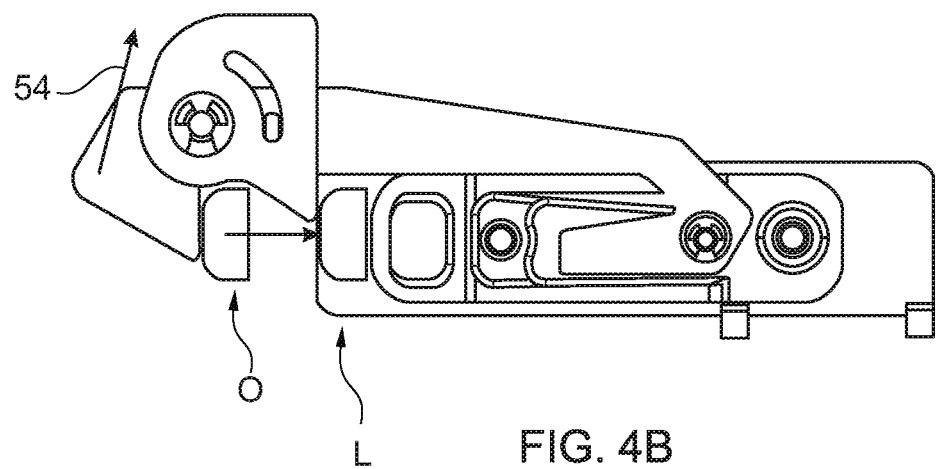

According to FIG. 4B, for unlocking, the pivoting part 8 is moved from the open position O into the release position L, wherein, comparable to FIG. 4A, the release element 48 runs over the latching piece 50 through a run-on slope with the latching device 54 being raised. In this case too, again first of all a movement takes place in the direction of the arrow 54 and a movement back takes place in the release position L.

Figure 4C:
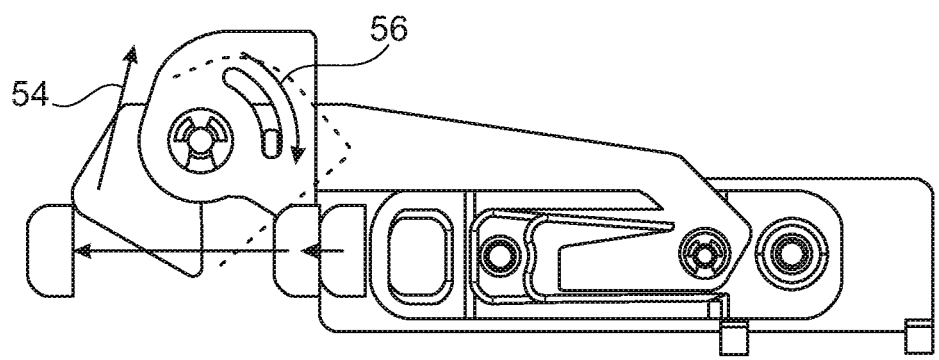

During the reverse movement according to FIG. 4C from the release position L through the open position O toward the closing position S, the release element 48 is pivoted by the latching piece 50 about the axis 52 in the direction of the arrow 56, and therefore a run-on slope (indicated by a dashed line) for the latching piece 50 is now again produced in the corresponding direction of movement. The release element 48 is also raised in this case together with the latching device 44 in the direction of the arrow 54, as a result of which the latching device 44 is raised over the latching piece 50 with the aid of the release element 48. Subsequently, the latching device 44 is lowered again counter to the direction of the arrow 54, and the release element 48 rotates back counter to the direction 56 into the position shown in FIG. 4C. The latching piece 50 is then free and the closing movement can be continued in the direction or as far as the closing position S.

FIG. 5 shows an alternative embodiment for a holding device 22. The holding device 22 contains a slotted guide mechanism 62 and a sliding element 64 which can be guided in the slotted guide mechanism 62. In the illustrated example, the slotted guide mechanism 62 is fixedly fastened as the part 42a (see FIG. 1) to the pivoting part 8. The sliding element 64 is fastened as the part 42b to the carrier 6, wherein a relative movement of the sliding element 64 into a supporting part 66 is made possible in this case.

Figure 6:
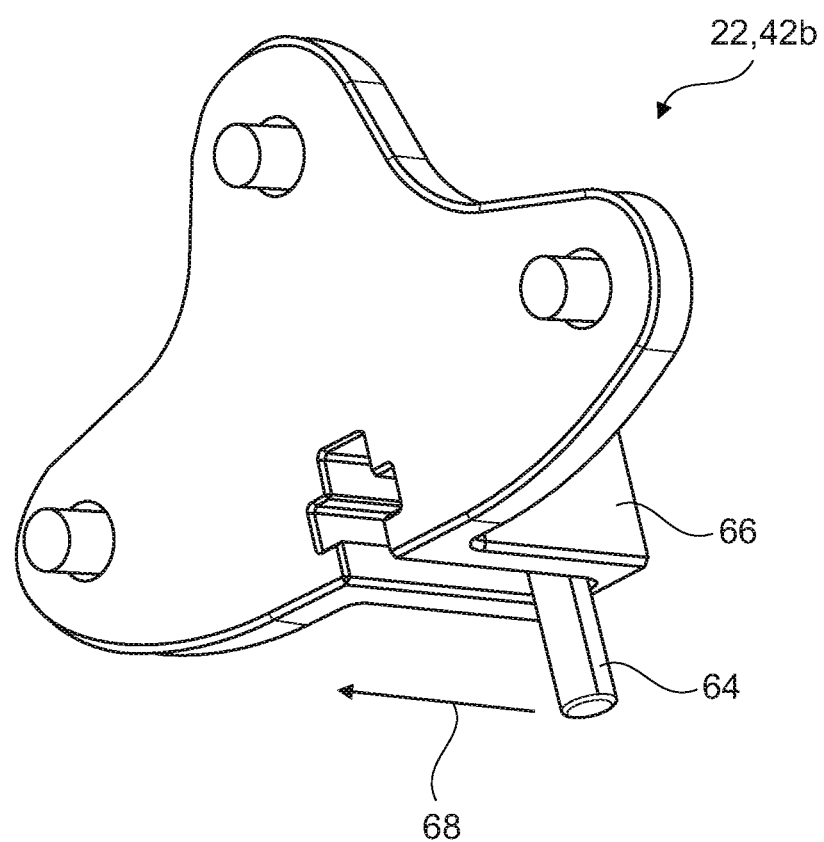
FIG. 6 is a perspective view of a movably mounted sliding element for a slotted guide mechanism.

An example of a sliding element 64 and a supporting part 66 is illustrated in detail in FIG. 6.

Figures 5A, 5B, 5C:
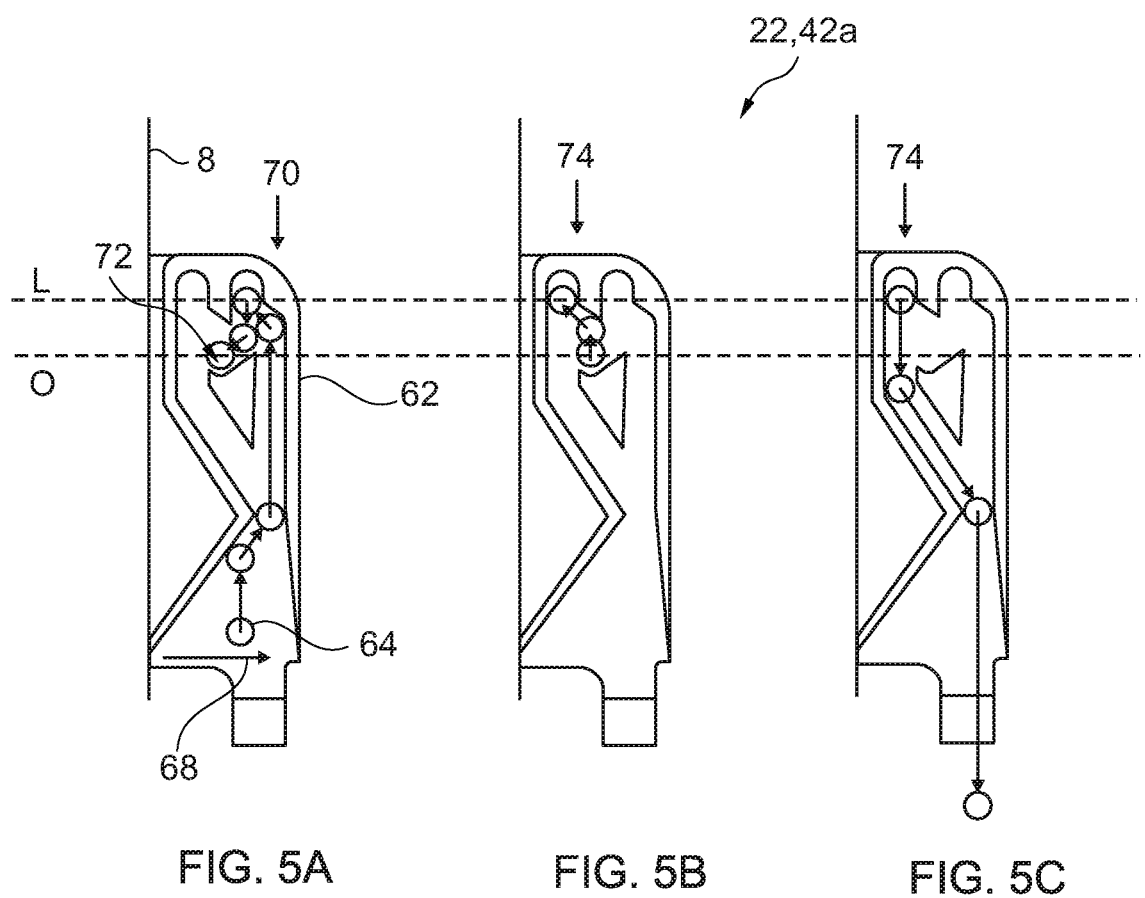
FIGS. 5A, 5B and 5C are front-elevational views of a holding device in the form of a slotted guide mechanism.

The movement of the sliding element 64 in the supporting part 66 takes place perpendicularly to the plane of the drawing in FIG. 1 and in and counter to the direction of an arrow 68 in FIG. 5A. In a comparable manner to FIG. 4, FIG. 5 likewise shows the movement of the sliding element 64 in the slotted guide mechanism 62 or relative thereto.

FIG. 5A shows the movement of the pivoting part 8 from the closing position S into the open position O, which movement takes place in this case, however, through the release position L. FIG. 5A in this case shows the movement of the sliding element 64 on an insertion path 70 in the slotted guide mechanism 62. In a first portion of the insertion path 70, the sliding element 64 in FIG. 5A is initially deflected to the right by using a run-on slope in order to enter the slotted guide portion which is in each case on the right in FIG. 5. After the open position O is exceeded, the sliding element 64 is deflected counter to the direction of the arrow 68 over a further run-on slope into a centering device in which the sliding element is located in the release position L. During the reversing movement of the pivoting part 8 from the release position L into the open position O, the sliding element 64 passes over a further run-on slope into a holding portion 72 of the slotted guide mechanism 62. The pivoting part 8 is held in the open position O in this case. The insertion path 70 is ended in this case.

FIG. 5B shows a renewed movement of the pivoting part 8 into the release position L on a removal path 74 (first portion), wherein the sliding element 64 is displaced further counter to the direction of the arrow 68 over a further run-on slope into a further centering portion in which the sliding element is in the release position L.

FIG. 5C finally shows the reversing movement from the release position L through the open position O in the direction of the closing position S, wherein the removal path 74 is continued. The movement thus takes place past the holding portion 72 and the sliding element 64 can thus move the slotted guide mechanism 62.

The sliding element 64 is therefore mounted movably on the carrier 6, and the slotted guide mechanism 62 is mounted fixedly on the pivoting part 8. In an embodiment (not illustrated), the two parts are each correspondingly mounted on the other element.

In both embodiments according to FIG. 4 and FIG. 5, the movement in FIGS. 4B and 5B, that is the unlocking or the preparation of the unlocking by bringing the pivoting part 8 out of the open position O into the release position L, can take place by loading the pivoting part 8 with stowage items (not illustrated) in such a way that a release force LK is caused at the gripping point 18.

The following is a summary list of reference numerals and the corresponding structure used in the above description of the invention:

2 Passenger cabin
4 Stowage compartment
6 Carrier
8 Pivoting part
10 Pivot axis
12 Pivoting region
14 Resetting device
16 (first) partial region
18 Gripping point
20 (second) partial region
22 Holding device
24 Energy accumulator
26 Arrow
28 Damping element
30a,b Installation point
31 Mechanical module
32 Part (active)
34 Drive part (passive)
36 Drive element
38 Interlocking element
40 Shaft piece
42a,b Part
44 Latching device
46 Axis
48 Release element
50 Latching piece
52 Axis
54 Arrow
56 Arrow
58 Stop device
60 Lock
62 Slotted guide mechanism
64 Sliding element
66 Supporting part
68 Arrow
70 Insertion path
72 Holding portion
74 Removal path
80 Contact device
O Open position
S Closing position
L Release position
E Installed position
F Closing force
G Gravitational force
LK Release force

The invention claimed is:

1. A stowage compartment for an overhead region of a passenger cabin of a passenger aircraft, the stowage compartment comprising:
   a carrier to be mounted in the passenger aircraft;
   a pivoting part being mounted on said carrier and being pivotable about a pivot axis, said pivoting part being rotatable in a pivoting region at least between an open position and a closing position, said pivoting part having a gripping point, and said pivoting region having a first partial region, a second partial region and an end being opposite said closing position;

a resetting device acting between said carrier and said pivoting part, said resetting device, in an installed position of the stowage compartment, bringing about, at said gripping point, at least in said first partial region, a closing force in a direction of said closing position;

at least in said second partial region beginning at said end of said pivoting region opposite said closing position, said closing force being greater than and opposed to a gravitational force effective at said gripping point and caused by said unloaded pivoting part; and said stowage compartment having a holding device for holding said pivoting part at said open position, said holding device being releasable by a movement of said pivoting part out of said open position away from said closing position toward a release position, said holding device operating separately from said resetting device; and said resetting device applying a constant spring force as said holding device is released.

2. The stowage compartment according to claim 1, wherein said resetting device contains an energy accumulator being charged during opening of said pivoting part and at least contributing to generating said closing force during unloading.

3. The stowage compartment according to claim 2, wherein said energy accumulator is a mechanical energy accumulator.

4. The stowage compartment according to claim 1, which further comprises a damping element damping a pivoting movement of said pivoting part in said pivoting region.

5. The stowage compartment according to claim 1, which further comprises:
   a drive element at least driving said resetting device; and
   a mechanism module containing an active part being mounted exclusively on said pivoting part, with said resetting device and with said drive element, and a passive drive part being mounted exclusively on said carrier for driving said active part through said drive element.

6. The stowage compartment according to claim 5, which further comprises an interlocking element acting as a drive between said drive element and said passive drive part.

7. The stowage compartment according to claim 1, wherein said holding device contains at least one of a clamping element or an adhesion element.

8. The stowage compartment according to claim 1, which further comprises a latching piece, said holding device containing a latching device latching on said latching piece in said open position and a release element being activated in said release position and switching said latching device into an ineffective state.

9. The stowage compartment according to claim 8, which further comprises a stop device defining an end position of said pivoting part at said release position, said stop device containing said latching piece for latching said latching device in said open position.

10. The stowage compartment according to claim 1, wherein:
   said holding device includes a slotted guide mechanism and a sliding element to be guided in said slotted guide mechanism;
   said slotted guide mechanism has a holding section;
   said sliding element is guidable over an insertion path into said holding section and is held in said holding section by movement of said pivoting part from a direction of said closing position toward said open position; and
   said sliding element is removable again out of said holding portion along a removal path by bringing said pivoting part from said open position through said release position toward said closing position.

11. The stowage compartment according to claim 10, wherein said sliding element is movably mounted on said carrier or said pivoting part, and said slotted guide mechanism is fixedly mounted on said pivoting part or said carrier.

12. The stowage compartment according to claim 10, wherein said sliding element is mounted on said carrier, and said slotted guide mechanism is mounted on said pivoting part.

13. The stowage compartment according to claim 1, wherein said holding device is configured to be unlocked by loading said pivoting part with a stowage item causing a release force at said gripping point.

14. The stowage compartment according to claim 1, which further comprises contact devices being respectively attached to said carrier and to said pivoting part, said contact devices having a clearance relative to each other in an intended static load situation of the stowage compartment and lying against each other during a dynamic load situation of greater loading.

* * * * *